UNITED STATES PATENT OFFICE.

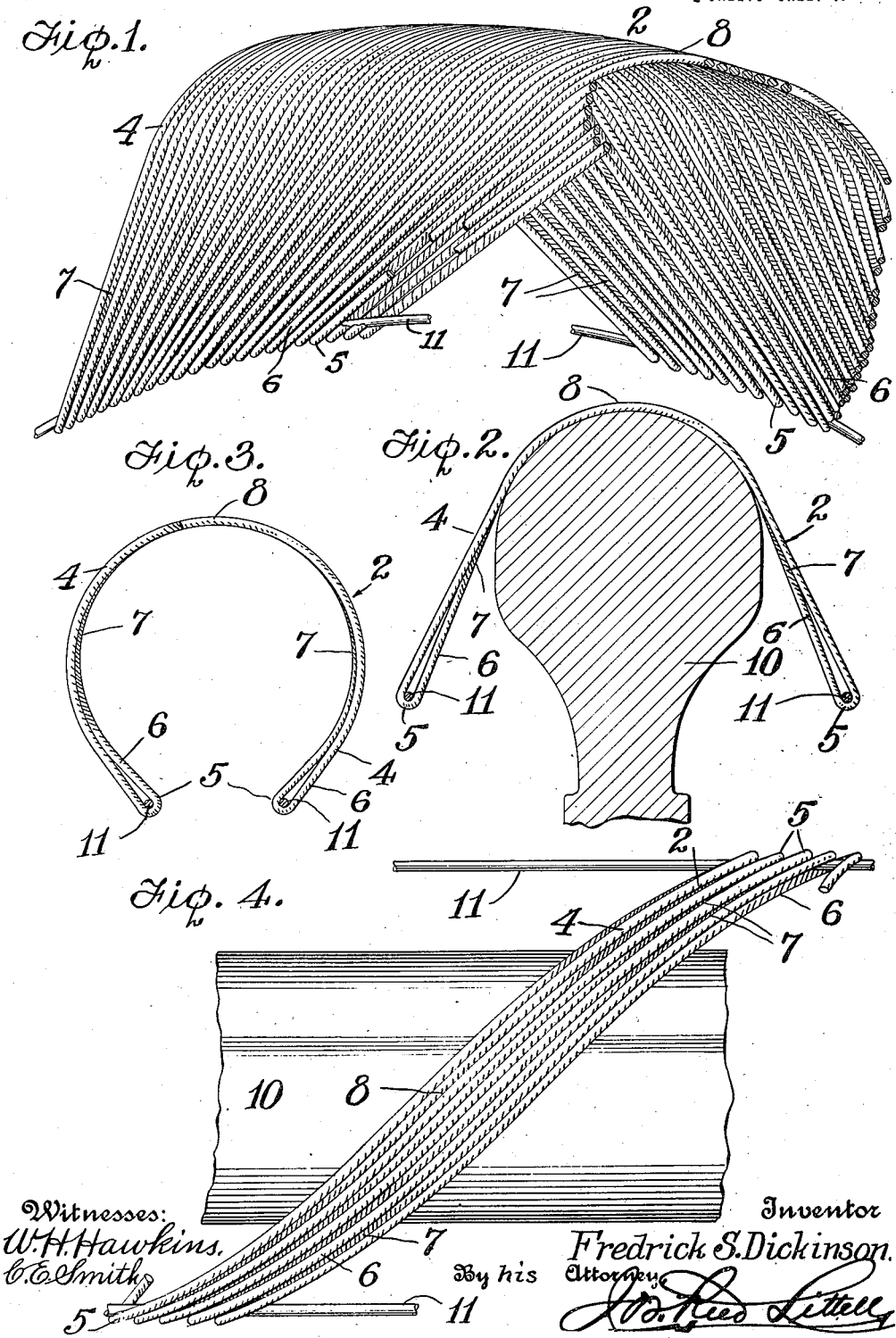

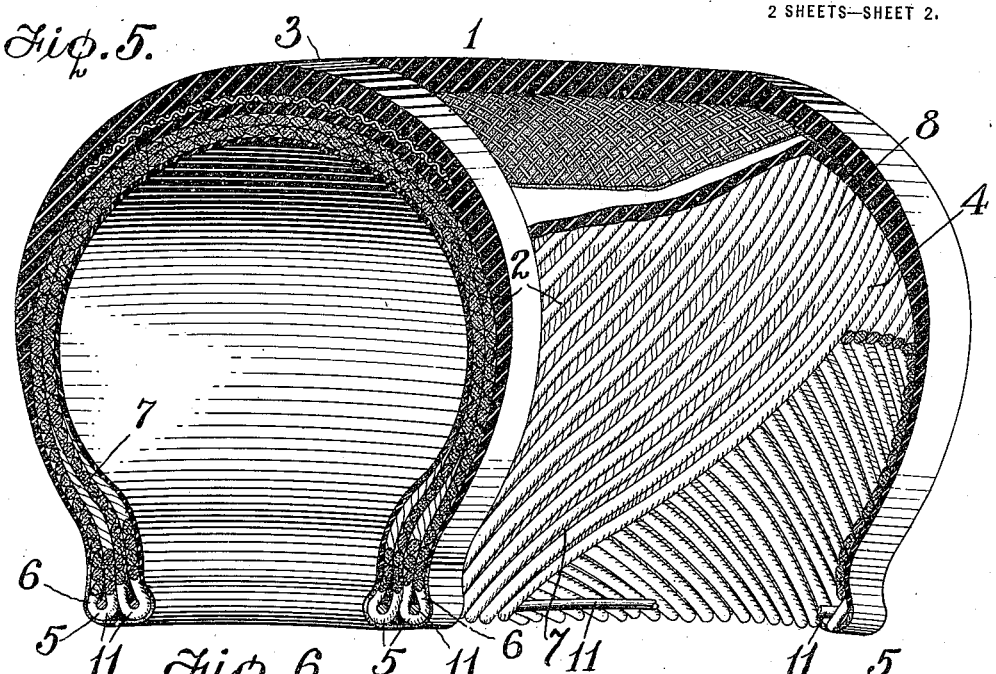
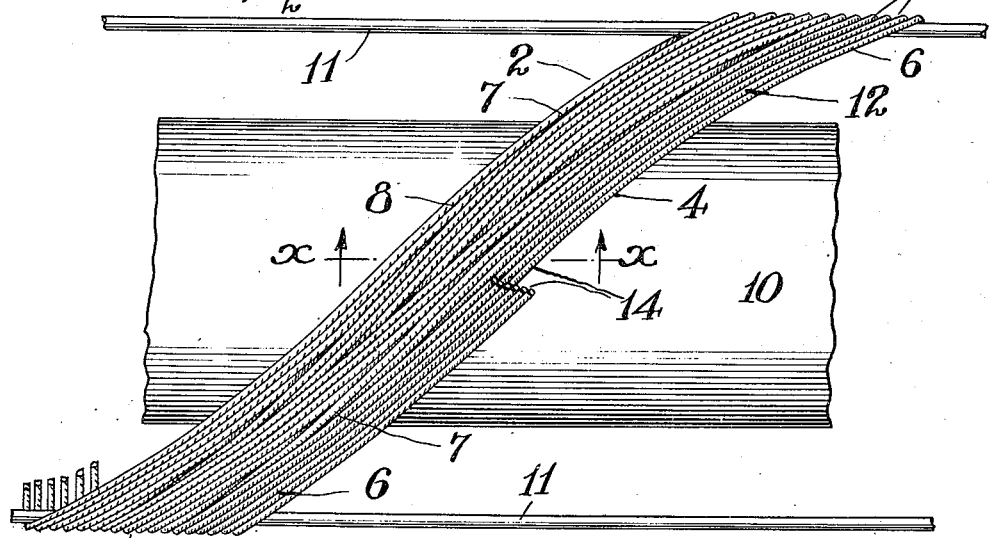
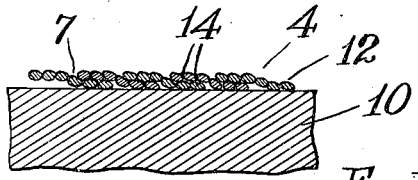

FREDRICK S. DICKINSON, OF NEW YORK, N. Y.

METHOD OF CONSTRUCTING PNEUMATIC TIRES.

1,420,611.   Specification of Letters Patent.   Patented June 20, 1922.

Application filed February 26, 1915. Serial No. 10,667.

*To all whom it may concern:*

Be it known that I, FREDRICK S. DICKINSON, a citizen of the United States, and resident of New York, in the county and State of New York, have invented certain new and useful Improvements in Methods of Constructing Pneumatic Tires, of which the following is a specification.

This invention relates to methods of constructing pneumatic tires such as are now commonly used upon automobiles and other vehicles and which comprise an elastic shoe or casing which constitutes the outer portion and tread of the tire and encloses the inner air tube and which has an internal textile body fabric or carcass.

My improvements have particular relation to that class of such tire shoes or casings in which the internal body fabric is of the "cord" type and made up of cords or threads laid to cover the circumferential area of the shoe or casing, in contradistinction to woven fabrics.

In the usual method of constructing such cord or thread body fabrics for the shoes or casings of pneumatic tires, as now generally employed, the cords or threads, are bunched, piled, crowded, packed and distorted at the portion of the body fabric which extends at the sides and rim edges of the shoe or casing, which conditions arise from the necessity of equalizing or compensating for the progressive variable difference in the circumference of the shoe or casing at all points of its area between the edge at the rim bead and the tread or periphery. The packing and distortion of the cords or threads, as just mentioned, to equalize or compensate for the differential circumference, not only fractures and weakens the fibers of which the cords or threads are composed but precludes that uniformity of tension which is requisite to durability in the life or service conditions of the tire.

Heretofore, in some methods of constructing the so-called "cord" tires of the class to which my improvements relate, the differential circumference has been equalized or compensated for by flattening the cords or threads and laying up the narrow edges of the cords, which are thus produced, against or at right angles to the core or mandril on which the cord fabric is formed, at that portion thereof which corrresponds to the side edge or rim bead of the tire, from which point the flattened cords are gradually twisted until the wide or flat side thereof lays against or parallel to that portion of the core or mandril which corresponds to the periphery or tread portion of the tire. While this method of construction compensates for the variable circumference, in that it serves to extend over or cover the full variable circumferential area of the tire shoe or casing, the flattening of the cords or threads fractures the fibers thereof and thereby materially weakens the fabric, and the twisting not only precludes the maintenance of uniformity of tension throughout the length of the cords or threads but it creates frictional action between the cords by displacing the position of the twist when the tire is depressed or flexed in service.

The object of my improved method of constructing the casings of pneumatic tires is to effectively overcome the conditions and objectionable features above set forth and produce an improved tire of the "cord" type in which the body fabric will retain all the initial strength of the fibers from which the cords or threads are made up and will ensure the requisite uniformity of tension, and my present improvements relate especially to the method of constructing the body fabric or carcass by laying or winding the cord in an initial position with relation to a support, to produce a fabric web, and thereafter shifting said cord to change the angle of lay thereof to the position in which the cord elements are associated in the completed carcass which is produced by said improved method.

In the drawings—

Figure 1 is a perspective view, partly in section, of a single-ply construction of the cord body fabric according to my improved method.

Fig. 2 is a cross-section of the core or mandril over which the cords or threads are laid in constructing the fabric according to my improved method, and illustrating the initial positional relationship of the cords thereto.

Fig. 3 is a detail cross-section illustrating the single-ply fabric produced by my improved method, in its contour as it would be in a finished tire under inflation.

Fig. 4 is a plan view illustrating the positional relationship of the cords or threads, as laid over the core or mandril on which the fabric is formed after the shifting method which changes the angle of lay.

Fig. 5 is a perspective view, partly in section, illustrating a completed tire shoe or casing constructed according to my improved method and showing a construction thereof in which superimposed plies of the cord body fabric are employed.

Fig. 6 is a plan view corresponding to Fig. 4 and illustrating a modified construction according to my improved method, in which a tape made up of a group of cords or threads is employed and laid in lieu of a single cord, and showing the angular lay of the tape after the shifting method which changes the initial position.

Fig. 7 is a detail cross-section on the line $x$—$x$, Fig. 6.

Corresponding parts in all the figures are denoted by the same reference characters.

This present application is directed especially to the improved method of shifting the cord to change the angle of lay, as before referred to and hereinafter described, and comprises the claims of an interference issue upon which priority was awarded applicant against one James A. Swinehart on applications filed by said Swinehart respectively April 17, 1915, Serial No. 21,980, and December 16, 1914, Serial No. 877,508, the general subject-matter of applicant's improved method having been divided from this application in interference and filed as a separate application on August 1, 1918, Serial No. 247,713, which divisional application matured into Patent No. 1,294,063, granted February 11, 1919.

Referring to the drawings, 1 designates the tire shoe or casing, which comprises the internal fabric body, 2, and the elastic external portion constituting the tread, 3, which casing incloses the usual air tube and is held in connection with the wheel rim in the usual manner.

The improved cord body fabric, as constructed according to my improved method, is constituted by the cords or threads, 4, which are laid to extend over or cover the entire circumferential area of the shoe or casing, the construction being preferably produced by the laying of a continuous length of cord or thread. Any suitable fiber material may be employed for the cords or threads, but they are preferably composed of non-extensible yarns, for instance, combed sea-island cotton spun and twisted in non-extensible yarns of suitable or adapted diameter.

In the general characteristics of the method of constructing the body fabric 2, in the form as herein shown according to my invention, the cords or threads 4 are turned or looped, as at 5, at the terminal side edges or rim-bead portion of the tire, and at said loops they are laid directly over each other, as at 6, from which point they are spread or diverged or radiated, in a gradual and continuous positional relationship, as at 7, at the circumferential side portions of the tire, so that they relatively spread and the under cord gradually emerges from beneath the upper cord, until they extend over or cover the full area of the greatest circumference of the tire at the tread or peripheral portion thereof, as at 8. The cord body fabric, under the improved method of construction above described, thus extends over or covers the full area of the varying or differential circumference of the tire shoe or casing, without packing or distortion or flattening or twisting of the cords or threads, and equalizes or compensates for the differential circumference at all points thereof. It will be noted that in their final position of lay the cords or threads extend on a line diagonal or at an oblique angle to the transverse or segmental cross-sectional plane of the tire as illustrated in Figs. 4 and 6. In a cord body fabric employing single cords or threads, as constructed according to the general conditions of the method herein shown, the gradually diverging or radiating cords have a position closely side by side at that portion of the fabric which is at the point of greatest circumference of the tire, which is where the cords cross the tread portion or periphery, as shown in Fig. 4.

In carrying out the general method of constructing the cord body fabric, according to the conditions of my invention as herein set forth, the cords are preferably laid over a suitable core or mandril, 10, of such size and form as to conform to the inner contour of the finished tire shoe or casing, which core is suitably mounted rotatably to be advanced in step movements graduated according to the diameter of the cord or thread used. At opposite sides of said mandrel, are mounted rings or hoops, 11, which are initially held in position a suitable distance away from the core, as shown in Fig. 2, the relative position of said rings and core being such that the cords or threads when laid will have a proper length to extend over the periphery of the core and downwardly at each side thereof a sufficient distance to permit the rings 11 and the looped portions 5 of the cords to form the side edges or bead of the tire shoe or casing. The cords or threads are then laid in a continuous length passing under and around one of the side rings 11 and from thence over and across the periphery of the core 10 and under and around the other side ring 11, the loops 5 being formed around the rings 11 and the gradual divergence or radiation of the cords in their angular position in the completed fabric or carcass being from this point over and across the periphery of the core, as at 7—8 (Fig. 4). The laying of the cords in the manner just indicated is continued until the fabric corresponding to the entire circumference of the tire shoe or casing is completed, after which the shifting of the angle of the cords is effected and the rings 11 are brought inwardly and set against the sides of the core and suitably clamped in this position in which the finished fabric will conform to the circumferential annular and segmental cross-sectional contour of the finished shoe or casing. If a plurality of plies are to be employed in the body fabric, as shown in Fig. 5, the succeeding plies are laid up in like manner as that just described, but the shifting of the cords in the succeeding ply is such that they extend preferably at an oblique angle or diagonal position opposite to that of the preceding ply.

When the desired number of plies have been laid up in the foregoing manner, an elastic bond is created between all the cords or threads by the application of a caoutchouc filler, this being preferably accomplished by impregnating the entire body fabric with soluble rubber in a vacuum chamber. There is thus produced a homogeneous caoutchouc and fabric carcass conforming to the contour of the finished shoe or casing and comprising a casing of rubber in which are embedded reinforcing cords or threads. After completion of the homogeneous cord fabric and caoutchouc carcass or casing, as just described, the latter is placed in association with the elastic external portion of the shoe or casing, which incloses the body fabric or carcass and forms the usual cushion and tread 3 of the tire, and the complete shoe or casing thus produced is vulcanized or cured in the customary manner.

In carrying out the improved method of constructing the cord body fabric, as herein set forth, I do not restrict myself to any particular mechanism for laying up or forming the cord skeleton or fabric which is produced by my method, as this may be accomplished in various ways. For instance, the cords or threads may be initially wound or looped over the two rings 11 with the latter positioned a proper distance apart to allow sufficient length of cord extending between them to form the width of body fabric which is to pass at the determined oblique angle from the edge or bead of one side of the tire to the edge or bead of the other side; then, into the annular completed ring or hoop of the cord fabric so formed upon the side rings 11, a sectional core or mandril is inserted, with the periphery thereof midway between the two side rings 11. The conditions of construction with the mechanism as above described are illustrated in Fig. 2, and in carrying out the improved method as comprised in my present invention, in relation to the mechanism including the rings, the latter serve as a support for the fabric web of the cord tire skeleton which is spirally wound onto such support. In their initial lay the cords are in a plane extending transversely of the annulus of the core, as shown in Fig. 2, after which said side rings are relatively turned in opposite directions to lay the cords over the core at the proper oblique angle in the relative position as hereinbefore described and as shown in Figs. 4 and 6 in which the cords overlay each other at the side bends or loops 5 and gradually diverge or radiate therefrom so that the under cord emerges from beneath the upper cord, as at 7, until the cords lay parallel and side by side, as as 8, over the area of the peripheral portion of the core.

In carrying out the improved method, the cord may be laid in connection with or anchored to any suitable supporting means, to produce a fabric web for the tire skeleton, and thereafter the conditions of the structure are shifted to change the angle of the cord elements relative to the sides of said fabric web. Either one or both of the marginal edge portions may be shifted to produce the angular lay, though in the employment of two supporting rings or strands around which the cord is wound, as herein illustrated, I prefer to shift both said rings or supporting strands in opposite directions.

The rings 11, upon which the cords or threads are looped or wound, in one preferred mechanism for carrying out my improved method of construction, may be of any suitable material, such as a metallic wire or a textile cord, and they preferably remain within the completed fabric, so that they form beads or retaining rings within the selvage edge of the fabric at the loops 5 (Fig. 5), at the side edges or beads of the shoe or casing, by which the tire is held in position on the wheel rim.

Under some circumstances of tire construction, according to my improved method, a single ply of cord body fabric, as shown in Figs. 1 and 4, may be employed, but under some circumstances a plurality of layers or plies or laminations of the fabric may be employed, as shown in Fig. 5, and where a plurality of plies are employed the respective plies are preferably laid under the shifting action to change their angle to extend in opposite directions in their diagonal or oblique lines with relation to the segmental cross-section of the shoe or casing, which reverse positions of the plies are best adapted to equalize all stresses or strains when the tire is depressed or flexed in service.

Under some circumstances of construction, according to my improved method, in lieu of laying a single cord or thread (as illustrated in Fig. 4), the cord body fabric may be laid from a tape made up of groups or multiples of single cords or threads, as in the modification illustrated in Figs. 6 and 7. The tape, shown at 12, in this method of construction, is laid and shifted in the same manner as the single cord or thread construction, with the side loops, 5, extending around the rings or hoops 11, at which point the tapes directly overlie each other and from which point the tapes gradually diverge or radiate, as at 7, so that the under tape gradually emerges from beneath the upper tape and the tapes overlie and extend over or cover, as at 8, the increased circumferential area of the peripheral or tread portion of the shoe or casing. In view of the increased width of the tape unit, in contradistinction to the single cord construction as shown in Fig. 4, it is not necessary that the tapes lay side by side at the peripheral or tread portion, as is the case with the single cord method of construction, but the tapes are laid to overlap a suitable portion of their respective widths, as shown at 14, at the peripheral or tread portion, which overlapping construction fully equalizes and compensates for the differential diameters in the same manner as the single cord construction and at the same time produces a double thickness of the cord body fabric at all points throughout its area (see Fig. 7), this method of construction being especially adapted to produce a single ply fabric in that the tape method of construction affords substantially the same thickness and strength of a double ply fabric formed by the single cord method of construction.

I do not desire to be understood as limiting myself to the detail features of the method of construction as herein illustrated and described, as it is manifest that variations therein may be resorted to in the adaptation of the method of constuction to varying conditions according to the type of pneumatic tire casing to which the cord body fabric as produced by my method is to be applied, without departing from the spirit and scope of my invention and improvements. I therefore reserve the right to all such variations and modifications as properly fall within the scope of my invention and the terms of the following claims.

Having thus described my invention, I claim and desire to secure by Letters Patent:

1. The method of constructing the internal body fabric for the shoe or casing of pneumatic tires of the "cord" type, which consists in anchoring two series of textile cord elements at the rim-bead portion in such position that the cord elements of one series overlie the cord elements of the other series at an angle to the annulus of the tire, and spreading or diverging said cord elements from said overlying position in a gradual positional relationship in which the under cord elements of one series gradually emerge from beneath the outer cord elements of the other series and lay side by side beyond said emerging portions at the circumferential side portions of the tire and conjointly produce a textile cord carcass which covers the space area at the tread or peripheral portion of the tire to equalize or compensate for and cover the progressive variable circumference of the tire.

2. The method of constructing the internal body fabric for the shoe or casing of pneumatic tires of the "cord" type, which consists in laying the textile cords in overlying position at an angle to the annulus of the tire at the rim-bead portion, and spreading or diverging the cords from said overlying position so that the under cord emerges from beneath the upper cord and the spreading cords lay side by side beyond said emerging portions and conjointly cover the space area of the progressive variable circumference of the tire at the side and tread or peripheral portions thereof.

3. The method of making a tire skeleton, which comprises winding cord spirally around a support to produce a fabric web, and thereafter shifting said cord to change the angle of the cord elements relative to the sides of said fabric web.

4. The method of making a tire skeleton, which comprises winding cord spirally around a support to produce an unwoven fabric web, and thereafter shifting said cord to change the angle of the cord elements relative to the sides of said fabric web.

5. The method of making a tire skeleton, which comprises winding cord spirally onto a pair of supports, and thereafter shifting one of the marginal edges of the structure to change the angle of the cord elements relative to the sides of said structure.

6. The method of making a tire skeleton, which comprises winding cord spirally onto a support to produce a fabric web, and thereafter shifting a portion of said support to change the angle of the cord elements relative to the sides of said fabric web.

7. The method of making a tire skeleton, which comprises winding cord spirally around a pair of supporting elements to produce a fabric web, and thereafter shifting one of said supporting elements to position the cord elements at an angle of lesser degree relative to the sides of said fabric web.

8. The method of making fabric tire skeletons, which comprises winding cord around a pair of strands to produce a fabric web, and thereafter shifting said cord to position the cord elements at an angle to the side edges of said fabric web.

9. The method of making fabric tire skeletons, which comprises winding cord around a pair of wire strands to produce a fabric web, said wire strands being located at the side edges of said fabric web, and thereafter shifting one of said wire strands to position the cord elements at an angle to the side edges of said fabric web.

In witness whereof I have signed my name in the presence of the subscribing witnesses.

FREDRICK S. DICKINSON.

Witnesses:
   Jos. Reed Littell,
   Agnes Lee.